(12) United States Patent
Greenberg et al.

(10) Patent No.: US 11,122,785 B2
(45) Date of Patent: Sep. 21, 2021

(54) SYSTEM AND USE METHOD FOR UNTETHERED TRAP BROUGHT TO SURFACE BY REMOTE CONTROL

(71) Applicants: Daniel Neil Greenberg, Bellingham, WA (US); Richard Preston Riels, Sedro Woolley, WA (US); Daniel Darwin Asebedo, Bellingham, WA (US); David Aaron Orsatti, Bellingham, WA (US); Kevin Erik Rand, Plymouth, MA (US)

(72) Inventors: Daniel Neil Greenberg, Bellingham, WA (US); Richard Preston Riels, Sedro Woolley, WA (US); Daniel Darwin Asebedo, Bellingham, WA (US); David Aaron Orsatti, Bellingham, WA (US); Kevin Erik Rand, Plymouth, MA (US)

(73) Assignee: CRAB RAFT, INC., Woolley, WA (US)

(*) Notice: Subject to any disclaimer, the term of this patent is extended or adjusted under 35 U.S.C. 154(b) by 422 days.

(21) Appl. No.: 16/159,711

(22) Filed: Oct. 14, 2018

(65) Prior Publication Data
US 2019/0110452 A1 Apr. 18, 2019

Related U.S. Application Data

(60) Provisional application No. 62/572,516, filed on Oct. 15, 2017.

(51) Int. Cl.
*A01K 69/08* (2006.01)
*H04B 13/02* (2006.01)
(Continued)

(52) U.S. Cl.
CPC .............. *A01K 69/08* (2013.01); *G08C 23/02* (2013.01); *H04B 11/00* (2013.01); *H04B 13/02* (2013.01)

(58) Field of Classification Search
CPC ........ A01K 69/06; A01K 69/08; A01K 69/10; A01K 99/00; G08C 23/02; H04B 11/00; H04B 13/02
(Continued)

(56) References Cited

U.S. PATENT DOCUMENTS 3,852,908 A * 12/1974 Christopher ........... A01K 63/00
43/102
4,034,693 A * 7/1977 Challenger ............ A01K 69/08
114/333
(Continued)

FOREIGN PATENT DOCUMENTS

WO WO-2017042786 A1 * 3/2017 ............. A01K 69/08

*Primary Examiner* — Darren W Ark
*Assistant Examiner* — Katelyn T Truong
(74) *Attorney, Agent, or Firm* — Robert Brownstein (57) ABSTRACT

The invention is a system comprising a wire cage trap and wire-cage enclosed lifting subsystem. The two systems are attached and submerged together. When ready to be retrieved, a sound control signal is conveyed to the system. The sound control signal is converted to an electric control signal, which enables inflation of a buoyancy bladder and bringing the wire-cage trap and wire-cage lifting subsystems to the surface. The invention may comprise sensors in the lifting system which can provide information about valve on-off state, gas pressure, depth and location. That information is converted from electric to sound signals and generated through the water.

9 Claims, 6 Drawing Sheets

(51) Int. Cl.
*H04B 11/00* (2006.01)
*G08C 23/02* (2006.01)

(58) Field of Classification Search
USPC .................. 43/100, 105, 4; 442/2, 6, 7, 9
See application file for complete search history.

(56) References Cited

U.S. PATENT DOCUMENTS

| | | | |
|---|---|---|---|
| 4,237,645 A * | 12/1980 | Kinser | A01K 69/06 |
| | | | 43/102 |
| 4,262,379 A * | 4/1981 | Jankiewicz | A01K 69/08 |
| | | | 102/406 |
| 4,507,983 A | 3/1985 | Norvell | |
| 5,496,136 A * | 3/1996 | Egan | B63C 11/2245 |
| | | | 405/186 |
| 5,904,666 A * | 5/1999 | DeDecker | G01F 15/003 |
| | | | 604/65 |
| 6,510,107 B2 * | 1/2003 | Diachok | G01S 15/96 |
| | | | 367/131 |
| 6,739,924 B1 * | 5/2004 | Groen | B63B 22/04 |
| | | | 441/21 |
| 7,112,111 B1 * | 9/2006 | King | B63B 1/00 |
| | | | 114/331 |
| 7,534,152 B1 | 5/2009 | Lloyd et al. | |
| 8,353,735 B2 | 1/2013 | Biousse | |
| 8,613,635 B2 | 12/2013 | Fisher | |
| 9,013,953 B2 | 4/2015 | Blizzard | |
| 9,889,905 B2 * | 2/2018 | Albertson | B63B 22/08 |
| 10,412,948 B2 * | 9/2019 | Burton | G10K 11/006 |
| 2003/0075096 A1 * | 4/2003 | Leonard | B63G 8/24 |
| | | | 114/331 |
| 2012/0231685 A1 | 9/2012 | Fisher | |
| 2013/0109257 A1 | 5/2013 | Abulrassoul | |
| 2013/0167428 A1 * | 7/2013 | Alhuwaishel | A01M 23/10 |
| | | | 43/102 |
| 2014/0186123 A1 | 7/2014 | Thompson et al. | |
| 2014/0315451 A1 | 10/2014 | Hatakeyama | |
| 2016/0235046 A1 * | 8/2016 | Etienne-Cummings | G01S 7/56 |
| 2018/0170486 A1 * | 6/2018 | Sinclair | A01K 61/54 |
| 2019/0061890 A1 * | 2/2019 | Fiorello | B63G 8/08 |

* cited by examiner

SYSTEM AND USE METHOD FOR UNTETHERED TRAP BROUGHT TO SURFACE BY REMOTE CONTROL

This application incorporates by reference application Ser. No. 16,159,710.

TECHNICAL FIELD

This is a system for catching bottom dwelling sea creatures and bringing them to the surface without the use of tether or towing lines.

BACKGROUND OF THE INVENTION

Bottom dwelling sea creatures, such as crabs and lobsters, are typically captured with baited traps that capture them alive and keep them alive until retrieved. These traps are usually tethered to a buoy so that the user can locate and retrieve them.

Should the tether break or become dislodged, the trap cannot be retrieved. Moreover, the tether extending from seafloor to surface may ensnare or entangle other sea life, and may be snagged by vessels that pass over the buoy inadvertently.

If one could invent a way to bring a fishing trap to the surface without using a tether, it would reduce the amount of sea life destruction that is an unintended consequence of tethered trap use, and could reduce the incidence of tether buoys and lines being caught in propellers of vessels that pass above them. It could also result in a significant reduction in undersea debris as tethered traps that break free are responsible for a significant portion of such debris.

BRIEF DESCRIPTION OF INVENTION

The invention disclosed and claimed is a trap for catching bottom-dwelling sea life, such as lobsters, crabs, flounder and the like.

A wire-cage trap is attached to a wire-cage lifting device. The lifting device comprises a compressed-gas cylinder capped by a remotely controlled valve. The remotely controlled valve is operative to respond to a sound control signal propagated through the water. The closed valve, for example, may open to inflate a buoyancy bladder which is attached to the lifting device and lifts the lifting device and attached wire-cage trap to the surface for retrieval.

The remotely controlled valve is a subsystem comprising the valve, a microcontrolled processing unit (MCU), sound-to-electric transducers for capturing sound control signals, electric-to sound transducers for sensor data back to the surface; an electric power source; and I/O subsystem.

The remotely controlled trap and lifting device is modular in that different size wire-cage traps can be attached, different capacity compressed-gas cylinders can be used, different size and capacity buoyancy bladders may be attached, and battery capacity can be adjusted for extending time between surfacing and recharging.

DETAILED DESCRIPTION OF THE INVENTION

Traps meant to rest on the sea floor to catch bottom dwelling sea life are typically attached to a tether which extends to the surface and is attached to a buoy. Should the tether become dislodged or tear, the trap is lost unless retrieved by a submersible vessel or diver. Such traps, if not retrieved, constitute a significant contribution to sea floor debris. Such traps, when the tether remains intact may entangle other sea life (called "by catch"), and may be ensnared by vessels that pass over the buoy.

The invention herein disclosed and claimed is a sea floor trap with a lifting subsystem that requires no tether lines and can be remotely controlled for ascending to the surface and subsequent retrieval. Its use could reduce sea floor debris, reduce unintended "by catch," and avoid entangling the propellers of vessels passing overhead.

Figure 1:
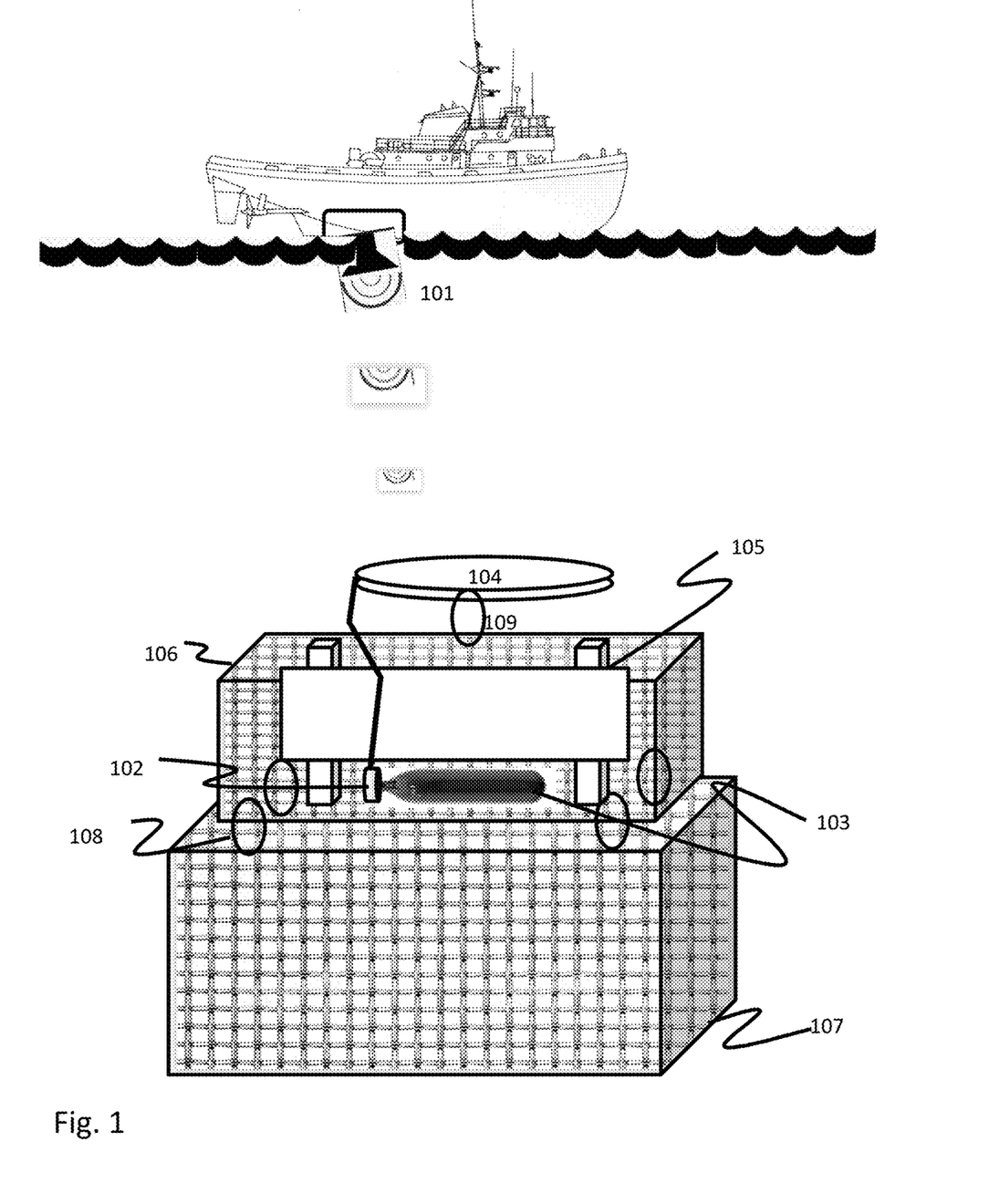
FIG. 1 depicts the invention system submerged on the sea floor as a surface vessel sends a sound control signal.

As shown in FIG. 1, the system comprises a wire-cage trap (107) wire-cage enclosure (106) that contains a compressed-gas cylinder (103) capped by a remotely controlled valve subsystem (102) which is attached to an inflatable buoyance bladder (104). When a surface vessel transmits a sound control signal (101), it is detected and decoded by the remotely controlled valve subsystem. It can be used to open the valve and permit inflation of the inflatable buoyancy bladder. To ensure that when allowed to submerge that the trap and lifting subsystems have a predetermined orientation with respect to the sea floor, the wire-cage enclosure has a set of hydrodynamic wing baffles (105) which permit it to submerge with the predetermined orientation depending upon the orientation of the baffles and location of the cylinder (e.g. the center of mass). Note that the lifting subsystem is attached to the wire-cage trap with one or more first attachment fixtures (108), and the inflatable buoyancy bladder is attached to the lifting subsystem with one or more second attachment fixtures (109).

Figure 2:
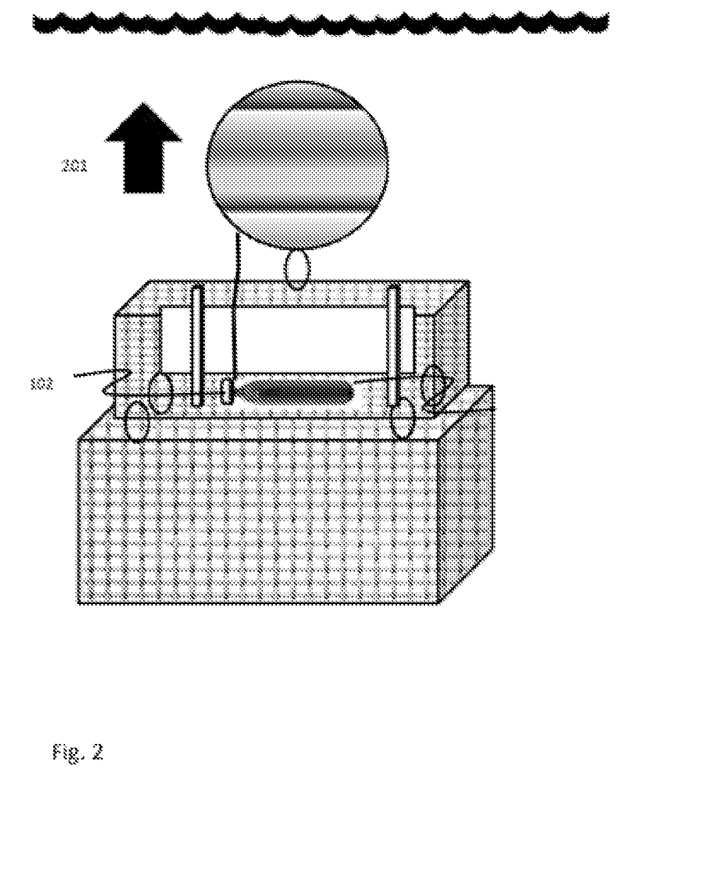
FIG. 2 depicts the invention system of FIG. 1 having received, decode and conveying a valve-opening control to the valve causing the buoyancy bladder to inflate and lifting the attached subsystems toward the surface.

FIG. 2 shows what occurs after the invention embodiment of FIG. 1 has received and responded to a sound signal that serves as an encoded control signal. The remotely controlled valve subsystem (102), having received and decoded the encoded control signal then sends an electric signal to the valve, causing it to open, which causes the buoyancy bladder to inflate due to flow of gas from the cylinder, and enables the attached subsystems to ascend (201).

Figure 3:
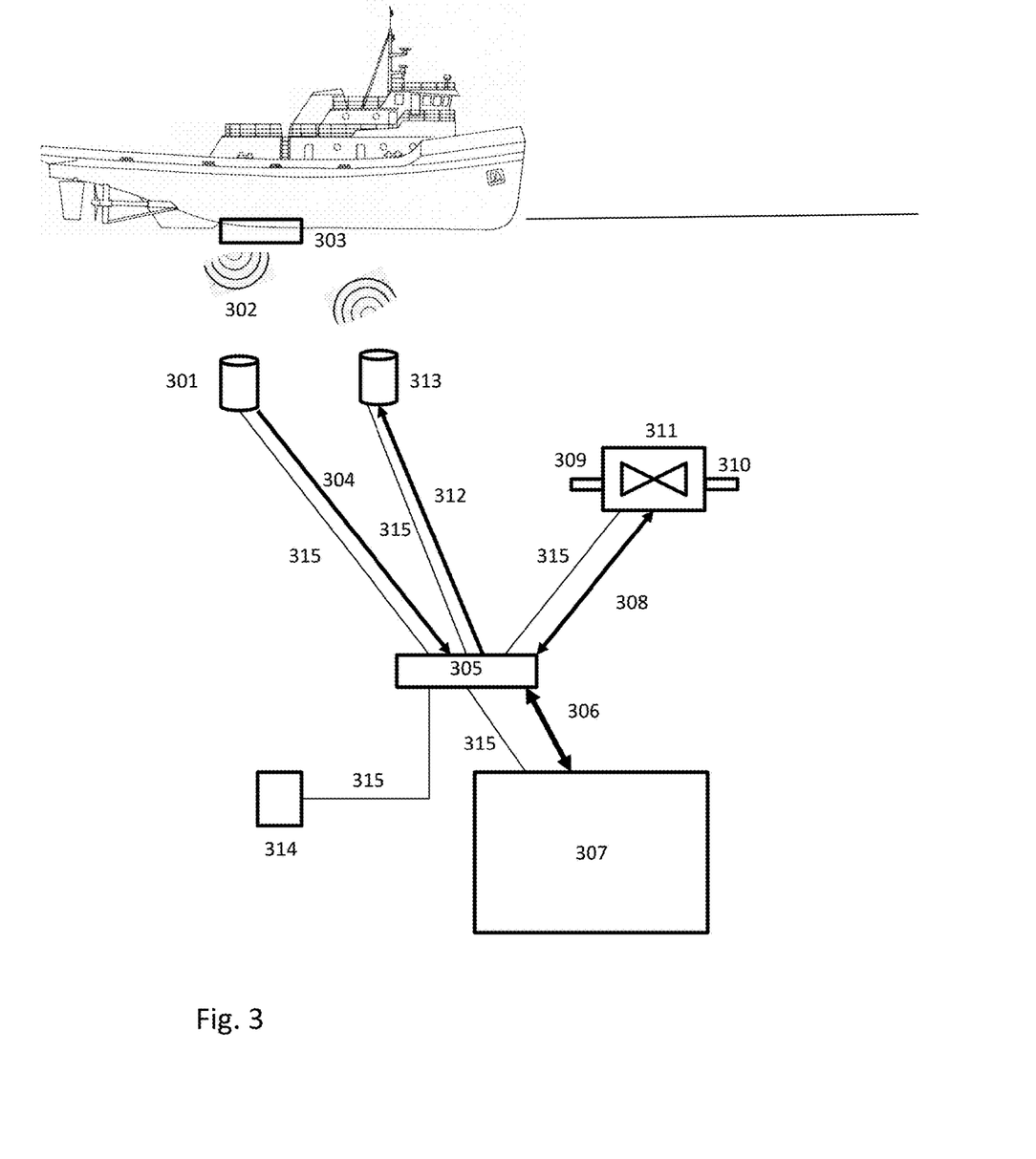
FIG. 3 depicts an embodiment of the remotely controlled valve subsystem.

FIG. 3 depicts an exemplary illustration of the invention system and a method of use. The system comprises a sound-to-electric transducer (301) which can receive encoded sound signals from vessel's remote electric-to-sound and sound-to-electric transducer system (303). The sound signal received by transducer 301 is conveyed along path 304 to an input-output (I/O) subsystem (305) and to a microcontrolled processing unit (307) along path (306). The microcontrolled processing unit (MCU) captures the remotely dispatched control signal and compares it to stored control-signal signatures. For example, if the encoded sound signal encoded a "valve open" command, the MCU would compare its signature to the stored control signal signatures and recognizing that they match, the MCU would then send a response control signal, a valve-open signal, via path 306, to the I/O subsystem (305) and on to the electrically controlled valve (311) via path 308. That would cause the valve to open allowing gas or liquid under pressure attached to its input port (309) to flow through to its output port (310). Note that the electric power source (314) is connected to the other subsystems over path 315.

Sensors in the valve (not shown) could detect valve state (open or closed), pressure within the valve, and other physical parameters, such as depth and location, and convey those sensors' data signals back along path 308, to the I/O (305), and to the MCU (307). The MCU can encode those sensor data signals, convey them via I/O (305), to an electric-to-sound transducer (313). The sound generated by that electric-to-sound transducer can be detected by the remote sound-to-electric transducer in the vessel's remote sound-to-electric transducer.

Figure 4:
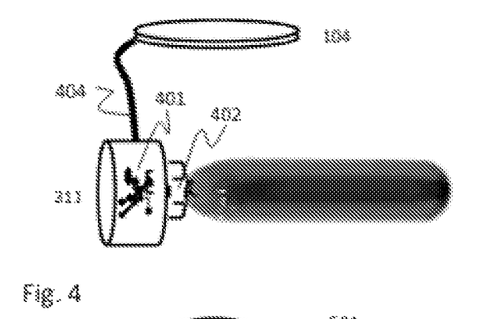
FIG. 4 depicts the invention system of FIG. 1 with valve closed, no gas flow to the bladder.

In FIG. 4, the invention system has not received a signal to open the valve (311). Thus, the buoyance bladder (104) remains deflated. Note that the subsystems (401) shown in FIG. 3 are all contained within the valve housing 403. The input port is via the standard fitting between valve housing 403 and gas cylinder (402); and the output port uses hose 404 to inflate the bladder.

Figure 5:
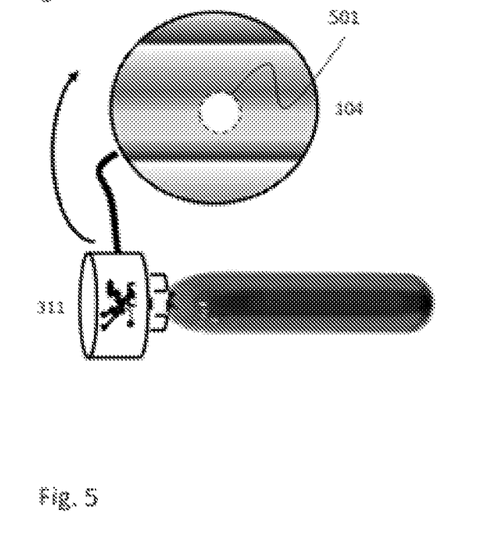
FIG. 5 depicts the invention system of FIG. 1 with the valve having opened, the buoyancy bladder having inflated.

In FIG. 5, the invention system has received a signal, decoded it, and conveyed a valve- open electric signal to the valve (311). This causes the inflatable buoyancy bladder (104) to inflate. In addition, a light source (501) contained within the bladder (104) could be turned on such that when it surfaces, at night, it is readily discernible.

Figure 6:
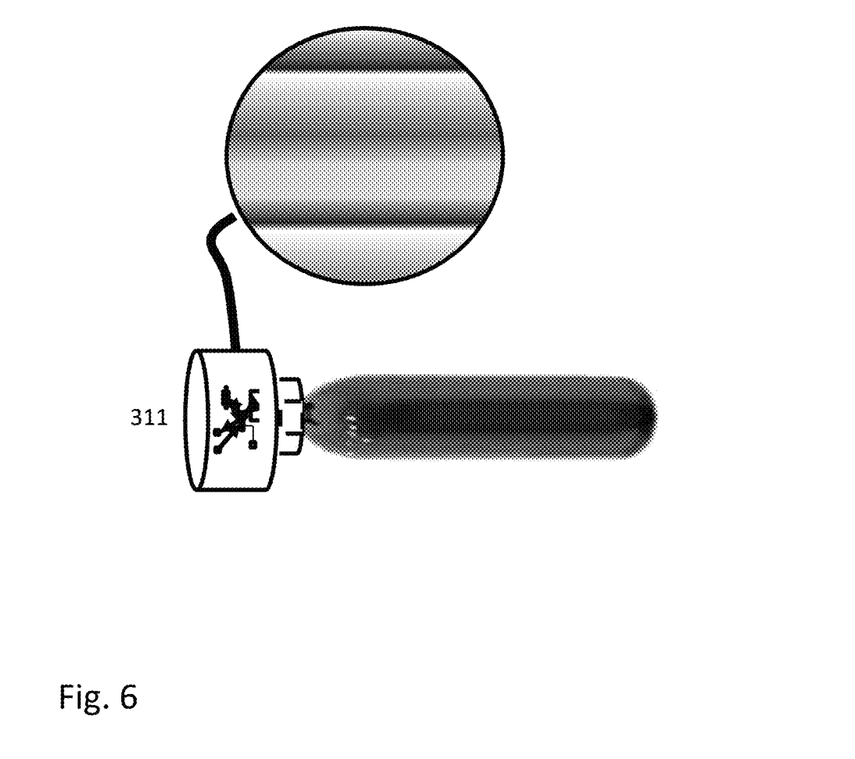
FIG. 6 depicts the invention system of FIG. 1 wherein the buoyance bladder has reached a predetermined inflation state, the valve is turned off, and the bladder remains inflated at its current level.

In FIG. 6, by means well known in the art, the inflation of the bladder, when it reaches an intended level, can cause the valve (311) to close preventing further flow of gas into the bladder. The closed valve will also prevent flow of gas from the bladder to pass through the valve.

Figure 7:
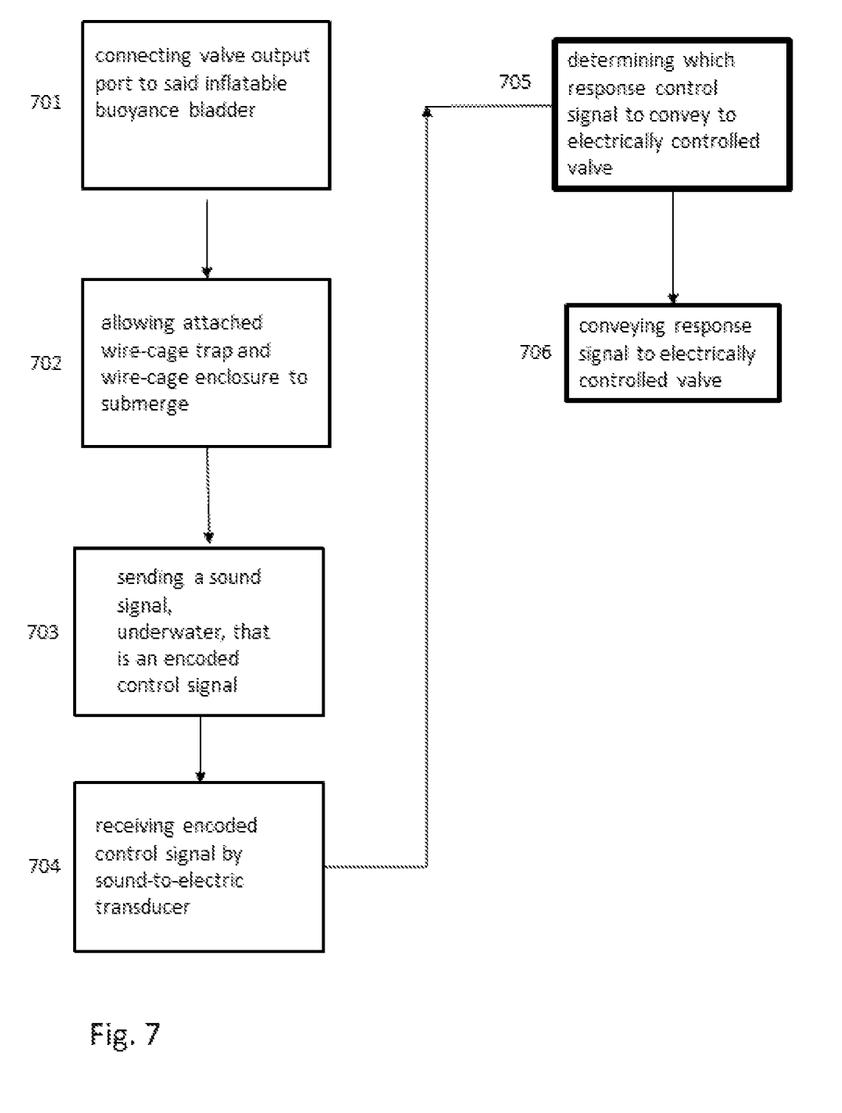
FIG. 7 is a flow diagram that provides an example of a method of use for the invention.

FIG. 7 is a flow diagram that is exemplary for a method of use of this invention to allow it to submerge to the sea floor and later remotely control its ascendance to the surface. As shown, an inflatable bladder is attached to the valve output port (701). Bladders of different size and capacity can be chosen based on weight to be lifted. The system is then allowed to descend (702). Later, to remotely control the system's surfacing, a sound signal comprising an encoded control signal is transmitted (703). That signal is received and decoded (704). A response control signal is conveyed to the valve (705), and the valve opens to allow inflation of the bladder and ascendance to the surface.

As already noted, the lifting system is intentionally modular. Different sizes of bladder and compressed-gas cylinders can be chosen, and different battery charge capacities can be selected. This enables the lifting system to be adapted to a variety of wire-cage trap sizes and predictable weights. It can also extend the time of submergence by extending battery life.

In addition to the sensors noted, sensors could be integrated that provide data on catch quantities. That data could be prompted and received by vessels tasked with enforcing sea life conservation regulations, for example.

To aid in retrieval in darkness, the buoyance bladder may comprise a lighting system that is enabled when surface breaching is detected. The bladder may also comprise a wireless location beacon that receives GPS coordinates and conveys same wirelessly. That system may also be enabled when surface breaching is detected.

What is claimed is:

1. A remotely controlled, untethered seafloor trap comprising:
   a wire-cage trap for containing sea life that enter said seafloor trap;
   a wire-cage enclosure for subsystems comprising a remotely controlled lifting subsystem;
   a first attachment fixture for attaching said wire-cage trap to said wire-cage enclosure;
   the remotely controlled lifting subsystem comprising;
   an inflatable buoyancy bladder;
   a second attachment fixture for attaching said inflatable buoyancy bladder to said wire-cage enclosure;
   a compressed-air cylinder capped by a valve housing which essentially contains a remotely controlled valve subsystem;
   said remotely controlled valve subsystem is controlled by electrical signals in response to remotely conveyed sound signals;
   said remotely controlled valve subsystem comprises a compressed-gas input port and output port;
   a sound-to-electric transducer operative to convert sound signals to analogous electrical signals;
   an electric-to-sound transducer operative to convert electrical signals to analogous sound signals;
   said sound-to-electric transducer and said electric-to-sound transducer comprise a two-way communications capability using sound waves and a water medium;
   one or a plurality of hydrodynamic wing baffles;
   said one or a plurality of hydrodynamic wing baffles operative to maintain a fixed orientation of said wire-cage enclosure relative to a seafloor during submergence;
   a hose operative to convey released gas from said output port to said inflatable buoyancy bladder;
   said remotely controlled valve subsystem comprises:
   an electrically controlled valve between the input port and the output port;
   an electric power source;
   said sound-to-electric transducer;
   said electric-to-sound transducer;
   a microcontrolled processing unit;
   at least one sensor operative to detect valve state and pressure;
   said at least one sensor operative to convey sensor data to said microcontrolled processing unit;
   said microcontrolled processing unit conveys said sensor data to said electric-to-sound transducer;
   said electric-to-sound transducer generates an analogous sensor-data sound signal.

2. The remotely controlled, untethered seafloor trap of claim 1 further comprising:
   said compressed-air cylinder capped by said remotely controlled valve system is modular and can be selected based on predetermined said wire-cage trap weight and depth.

3. The remotely controlled, untethered seafloor trap of claim 1 further comprising:
   said remotely controlled valve subsystem is modular and can accommodate selected battery capacities based on predetermined submergence duration.

4. The remotely controlled, untethered seafloor trap of claim 1 further comprising:

said inflatable buoyancy bladder is modular and can be selected based on predetermined said wire-cage trap weight and depth.

5. The remotely controlled, untethered seafloor trap of claim 1 further comprising:
said inflatable buoyancy bladder comprises a lighting subsystem to enable visible location during darkness hours.

6. The remotely controlled, untethered seafloor trap of claim 1 further comprising:
said inflatable buoyancy bladder comprises a wireless location subsystem providing wirelessly disseminated location coordinates.

7. The remotely controlled, untethered seafloor trap of claim 1 further comprising:
said at least one sensor is operative to detect valve on-or-off state.

8. The remotely controlled, untethered seafloor trap of claim 1 further comprising:
said at least one sensor is operative to detect valve depth.

9. The remotely controlled, untethered seafloor trap of claim 1 further comprising:
said at least one sensor is operative to detect valve location.

* * * * *